(12) United States Patent
Gu et al.

(10) Patent No.: US 12,738,592 B2
(45) **Date of Patent: *Sep. 15, 2026**

(54) PRESSURE RELIEF APPARATUS, BATTERY CELL, BATTERY, AND ELECTRICAL DEVICE

(71) Applicant: CONTEMPORARY AMPEREX TECHNOLOGY (HONG KONG) LIMITED, Hong Kong (CN)

(72) Inventors: Mingguang Gu, Ningde (CN); Xiaobo Chen, Ningde (CN); Yao Li, Ningde (CN); Xuehui Wang, Ningde (CN); Yucang Hao, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 655 days.

This patent is subject to a terminal disclaimer.

(21) Appl. No.: 18/187,207

(22) Filed: Mar. 21, 2023

(65) Prior Publication Data

US 2023/0223644 A1 Jul. 13, 2023

Related U.S. Application Data

(63) Continuation of application No. PCT/CN2021/115766, filed on Aug. 31, 2021.

(51) Int. Cl.
*H01M 50/342* (2021.01)
*F16K 17/40* (2006.01)
(Continued)

(52) U.S. Cl.
CPC ....... *H01M 50/3425* (2021.01); *F16K 17/403* (2013.01); *H01M 50/147* (2021.01);
(Continued)

(58) Field of Classification Search
None
See application file for complete search history.

(56) References Cited

U.S. PATENT DOCUMENTS 12,451,559 B2 * 10/2025 Zhou .................. H01M 50/103
2003/0028399 A1 2/2003 Davis et al.
2020/0091551 A1 3/2020 Sodeyama

FOREIGN PATENT DOCUMENTS

CN 5876794 B2 3/2016
CN 107004805 A 8/2017
(Continued)

OTHER PUBLICATIONS

Machine translation of JP 2016157570, Sep. 2016.*
(Continued)

*Primary Examiner* — Jonathan Crepeau
(74) *Attorney, Agent, or Firm* — ANOVA LAW GROUP, PLLC

(57) ABSTRACT

A pressure relief apparatus includes a pressure relief body and a plurality of score grooves. The pressure relief body includes a pressure relief portion, and the pressure relief portion has a first surface and a second surface opposite to each other in a thickness direction of the pressure relief portion. A plurality of score grooves are sequentially arranged at the pressure relief portion in a direction from the first surface to the second surface. In two adjacent score grooves in the thickness direction, a maximum width of a score groove farther away from the first surface is less than a minimum width of a score groove closer to the first surface.

18 Claims, 7 Drawing Sheets

(51) Int. Cl.

| | |
|---|---|
| ***H01M 50/147*** | (2021.01) |
| ***H01M 50/15*** | (2021.01) |
| ***H01M 50/249*** | (2021.01) |

(52) U.S. Cl.

CPC ......... *H01M 50/15* (2021.01); *H01M 50/249* (2021.01); *H01M 2200/20* (2013.01); *H01M 2220/20* (2013.01)

(56) References Cited

FOREIGN PATENT DOCUMENTS

| | | | |
|---|---|---|---|
| CN | 207134411 | U | 3/2018 |
| CN | 111033790 | A | 4/2020 |
| CN | 111446388 | A | 7/2020 |
| CN | 212136523 | U | 12/2020 |
| CN | 212461953 | U | 2/2021 |
| CN | 213340640 | U | 6/2021 |
| CN | 213546511 | U | 6/2021 |
| CN | 215989101 | U | 3/2022 |
| CN | 215989102 | U | 3/2022 |
| CN | 114447514 | A | 5/2022 |
| CN | 217182358 | U | 8/2022 |
| CN | 218414924 | U | 1/2023 |
| EP | 2328207 | A1 | 6/2011 |
| HK | 1211676 | A1 | 5/2016 |
| JP | S61143936 | U | 9/1986 |
| JP | H11204093 | A | 7/1999 |
| JP | 2000285892 | A | 10/2000 |
| JP | 2000348700 | A | 12/2000 |
| JP | 2004178820 | A | 6/2004 |
| JP | 2005038709 | A | 2/2005 |
| JP | 2006351234 | A | 12/2006 |
| JP | 2009004271 | A | 1/2009 |
| JP | 2010165590 | A | 7/2010 |
| JP | 2014049398 | A | 3/2014 |
| JP | 2014102935 | A | 6/2014 |
| JP | 2014116220 | A | 6/2014 |
| JP | 2015069716 | A | 4/2015 |
| JP | 2016157570 | A | 9/2016 |
| JP | 2016189248 | A | 11/2016 |
| JP | 3227978 | U | 10/2020 |
| WO | 2021120043 | A1 | 6/2021 |

OTHER PUBLICATIONS

Machine translation of JP 2015069716, Apr. 2015.*

State Intellectual Property Office of China First Office Action for Application No. 202280005459.3 Jun. 18, 2024 10 pages (including translation).

The European Patent Office (EPO) The Extended European Search Report for Application No. 22863539.7 Jan. 17, 2025 9 Pages.

The European Patent Office (EPO) The Extended European Search Report for Application No. 22863534.8 Jan. 28, 2025 10 Pages.

The European Patent Office (EPO) The Extended European Search Report for Application No. 22863540.5 Jan. 17, 2025 10 Pages.

The Japan Patent Office (JPO) Notice of Reasons for Refusal for Application No. 2023-530006 Jan. 7, 2025 6 Pages (including translation).

State Intellectual Property Office of China Notice of Grant for Application No. 202280005459.3 Dec. 11, 2024 2 pages (including translation).

The Japan Patent Office (JPO) Decision to Grant a Patent for Application No. 2023-528257 Dec. 10, 2024 6 Pages (including translation).

The European Patent Office (EPO) Intention to Grant for Application No. 21948694.1 Oct. 23, 2024 5 Pages.

Korean Intellectual Property Office (KIPO) Office Action 1 for Application No. 10-2023-7003696 Oct. 30, 2024 17 Pages (including translation).

The Japan Patent Office (JPO) Notice of Reasons for Refusal for Application No. 2023-528257 Dec. 10, 2024 6 Pages (including translation).

Korean Intellectual Property Office (KIPO) Office Action 1 for Application No. 10-2023-7015526 Nov. 27, 2024 16 Pages (including translation).

Korean Intellectual Property Office (KIPO) Office Action 1 for Application No. 10-2023-7016596 Nov. 27, 2024 14 Pages (including translation).

Korean Intellectual Property Office (KIPO) Office Action 1 for Application No. 10-2023-7016558 Nov. 27, 2024 16 Pages (including translation).

The Japan Patent Office (JPO) Decision to Grant a Patent for Application No. 2023-530008 Oct. 29, 2024 5 Pages (including translation).

The World Intellectual Property Organization (WIPO) International Search Report and Written Opinion for PCT/CN2022/116298 Nov. 10, 2022 17 Pages (including translation).

The World Intellectual Property Organization (WIPO) International Search Report and Written Opinion for PCT/CN2022/116275 Nov. 10, 2022 18 Pages (including translation).

The World Intellectual Property Organization (WIPO) International Search Report and Written Opinion for PCT/CN2022/116299 Nov. 9, 2022 19 Pages (including translation).

Canadian Intellectual Property Office Office Action for Application No. 3183528 Jun. 12, 2024 4 Pages.

State Intellectual Property Office of China Notice of Grant of Utility Model Patent Rights for Application No. 202122087757.7 Jan. 6, 2022 2 pages (including translation).

The Japan Patent Office (JPO) Decision to Grant a Patent for Application No. 2023-502626 Jun. 4, 2024 6 Pages(including translation).

State Intellectual Property Office of China Notice of Grant of Utility Model Patent Rights for Application No. 202222314334.9 Nov. 18, 2022 2 pages (including translation).

The Japan Patent Office (JPO) Notice of Reasons for Refusal for Application No. 2023-528257 Jun. 4, 2024 12 Pages(including translation).

State Intellectual Property Office of China Notice of Grant of Utility Model Patent Rights for Application No. 202222326423.5 Jan. 6, 2023 2 pages (including translation).

The Japan Patent Office (JPO) Notification of Reasons for Refusal for Application No. 2023-530006 Jun. 11, 2024 7 Pages(including translation).

State Intellectual Property Office of China Notice of Grant of Utility Model Patent Rights for Application No. 202222314407.4 Nov. 18, 2022 2 pages (including translation).

The Japan Patent Office (JPO) Notification of Reasons for Refusal for Application No. 2023-530008 May 28, 2024 12 Pages(including translation).

The European Patent Office (EPO) The Extended European Search Report for Application No. 21948694.1 Apr. 15, 2024 8 Pages.

The Japan Patent Office (JPO) Notification of Reasons for Refusal for Application No. 2023-502626 and Translation Feb. 27, 2024 9 Pages.

The World Intellectual Property Organization (WIPO) International Search Report and Written Opinion for PCT/CN2021/115766 May 7, 2022 12 Pages (including translation).

Indian Patent Office First Examination report for Application No. 202327018180 Dec. 15, 2025 5 page.

Indonesia General of Intellectual Property Notification of the Results of the Initial Substantive Examination for Application No. P00202302115 Nov. 20, 2025 7 pages (including translation).

United States Patent and Trademark Office (USPTO) Final Action Rejection for U.S. Appl. No. 18/333,167, filed Oct. 2, 2025 22 Pages.

The European Patent Office (EPO) Communication under Rule 71(3) EPC for Application No. 22863539.7 Oct. 27, 2025 57 Pages.

The European Patent Office (EPO) Communication pursuant to Article 94(3) EPC for Application No. 22863534.8 Oct. 8, 2025 6 Pages.

The European Patent Office (EPO) Communication pursuant to Article 94(3) EPC for Application No. 22863540.5 Oct. 1, 2025 6 Pages.

* cited by examiner

PRESSURE RELIEF APPARATUS, BATTERY CELL, BATTERY, AND ELECTRICAL DEVICE

CROSS-REFERENCE TO RELATED APPLICATION

This application is a continuation of International Application No. PCT/CN2021/115766, filed on Aug. 31, 2021, the entire content of which is incorporated herein by reference.

TECHNICAL FIELD

The present application relates to the field of battery technologies, and specifically, to a pressure relief apparatus, a battery cell, a battery, and an electrical device.

BACKGROUND ART

Batteries are widely used in electronic devices, such as mobile phones, laptop computers, battery vehicles, electric vehicles, electric planes, electric ships, electric toy cars, electric toy ships, electric toy planes, and electric tools.

In the battery technology, in order to ensure the safety of a battery cell, a pressure relief apparatus is generally arranged in the battery cell. When the internal pressure or temperature of the battery cell reaches a threshold, the pressure relief apparatus ruptures at a position where a score groove is arranged, thereby relieving the pressure inside the battery cell. For a general pressure relief apparatus, pressure relief may also occur when an internal pressure of a battery cell is within a normal range, and the long-term reliability is poor.

SUMMARY

A pressure relief apparatus, a battery cell, a battery, and an electrical device are provided in embodiments of the present application, which can effectively improve the long-term reliability of the pressure relief apparatus.

In a first aspect, a pressure relief apparatus is provided in an embodiment of the present application, and includes: a pressure relief body, including a pressure relief portion, the pressure relief portion having a first surface and a second surface opposite to each other in a thickness direction thereof; and a plurality of score grooves arranged at the pressure relief portion in sequence in a direction from the first surface to the second surface, wherein in two adjacent score grooves in the thickness direction, a maximum width of a score groove far away from the first surface is less than a minimum width of a score groove close to the first surface.

In the above technique solution, the pressure relief portion is provided with a plurality of score grooves, and the plurality of score grooves are sequentially arranged on the pressure relief portion in the direction from the first surface to the second surface of the pressure relief portion. In two adjacent score grooves in the thickness direction of the pressure relief portion, a maximum width of the score groove far from the first surface is smaller than a minimum width of the score groove close to the first surface. The pressure relief apparatus of this structure adopts a multi-stage score groove structure, which can reduce a forming force received by the pressure relief portion during forming of each level of score groove, and reduce the risk of generating cracks in the pressure relief portion. The pressure relief apparatus is less likely to fail due to cracks in the pressure relief portion at positions where the score grooves are arranged, thereby improving the long-term reliability of the pressure relief apparatus.

In some embodiments, the plurality of score grooves include a first score groove and a second score groove extending in the same direction, and the first score groove is arranged on a bottom surface of the second score groove.

In the above technique solution, the extension direction of the first score groove is consistent with the extension direction of the second score groove, and the first score groove is arranged on the bottom surface of the second score groove. On the one hand, this structure is convenient to forming of the first score groove to ensure the length of the first score groove, and on the other hand, it can be ensured that the maximum width of the first score groove is smaller than the minimum width of the second score groove.

In some embodiments, the plurality of score grooves further include a third score groove, the third score groove is arranged on the first surface, and the second score groove is arranged on a bottom surface of the third score groove.

In the above technique solution, the plurality of score grooves further include the third score groove arranged on the first surface, and the second score groove is arranged on the bottom surface of the third score groove. In other words, three levels of score grooves are arranged on the pressure relief portion to ensure that the forming force received by the pressure relief portion will not be too large during forming of each level of score groove, thereby reducing the risk of generating cracks in the pressure relief portion.

In some embodiments, the bottom surface of the third score groove is provided with a plurality of second score grooves.

In the above technique solution, the plurality of second score grooves are arranged on the bottom surface of the third score groove, so that the pressure relief portion can be cracked at the position of each second score groove to realize pressure relief, which has a better pressure relief effect and increases the pressure relief rate. In addition, one third score groove corresponds to a plurality of second score grooves, and therefore, the forming process can be simplified and the forming cost can be reduced.

In some embodiments, the plurality of second score grooves include a first groove section, a second groove section, and a third groove section. The first groove section and the second groove section are arranged at an interval, and both the first groove section and the second groove section intersect with the third groove section. The pressure relief portion includes an opening region jointly formed by the first groove section, the second groove section, and the third groove section, and the opening region is configured to open with the first groove section, the second groove section, and the third groove section as boundaries.

In the above technique solution, the first groove section and the second groove section are arranged at an interval, and both the second groove section and the second groove section intersect with the third groove section. The first groove section, the second groove section, and the third groove section jointly jointly form the opening region. After the pressure relief portion is ruptured at positions of the first groove section, the first groove section, and the second groove section, a part of the pressure relief portion located in the opening region will be opened to relieve the pressure, which increases the pressure relief area of the pressure relief portion rate, and improves the pressure relief rate of the pressure relief portion.

In some embodiments, the plurality of second score grooves further include a fourth groove section, and in an extension direction of the third groove section, the fourth groove section is located between the first groove section and the second groove section, and the fourth groove section intersects with the third groove section.

In the above technique solution, the fourth groove section located between the first groove section and the second groove section intersects with the third groove section, and the pressure relief portion has a more concentrated stress at the intersection of the third groove section and the fourth groove section, and is more easily ruptured. Therefore, the pressure relief portion ruptures along the third groove section from the intersection of the third groove section and the fourth groove section in the pressure relief process, and ruptures along the first groove section and the second groove section after the third groove section is ruptured, for achieving the rapid pressure relief.

In some embodiments, in the extension direction of the third groove section, a distance from the intersection of the fourth groove section and the third groove section to the first groove section is equal to a distance from the intersection of the fourth groove section and the third groove section to the second groove section.

In the above technique solution, the distance from the intersection of the fourth groove section and the third groove section to the first groove section is equal to the distance from the intersection of the fourth groove section and the third groove section to the second groove section, so that the pressure relief portion, after rupturing along the third groove section at the intersection of the fourth groove section and the third groove section, can be ruptured simultaneously along the first groove section and the second groove section.

In some embodiments, the first groove section, the second groove section, and the third groove section jointly form two opening regions, and the two opening regions are located on two sides of the third groove section, respectively.

In the above technique solution, the first groove section, the second groove section, and the third groove section jointly form two opening regions, and the two opening regions are located on both sides of the third groove section, respectively. In the pressure relief process of the pressure relief portion, parts of the pressure relief portion in the two pressure relief regions can be opened in a split manner for pressure relief, which can effectively improve the pressure relief rate of the pressure relief portion.

In some embodiments, the second surface is provided with a notch groove located in the opening region, and in the extension direction of the first groove section, there is a distance between the notch groove and the third groove section.

In the above technique solution, there is a distance between the notch groove and the third groove section in the extension direction of the first groove section, and at least a part of notch groove is located in the opening region, so that in the pressure relief process of the pressure relief portion, the part of the pressure relief portion located in the opening region can be turned over with the position where the pressure relief portion is located in the notch groove as an axis, which makes it easier to open for pressure relief.

In some embodiments, a distance between the first surface and the second surface is H0, and a distance from a bottom surface of the score groove closest to the second surface to the second surface is H1, and H0 and H1 meet a relational expression: $H1/H0<0.2$.

In the above technique solution, a ratio of the distance from the bottom surface of the score groove closest to the second surface to the second surface to the distance from the first surface to the second surface is less than 0.2, so that the thickness of a part between the bottom surface of the score groove closest to the second surface and the second surface accounts for a small proportion of the total thickness of the pressure relief portion. Therefore, the part between the bottom surface of the score groove closest to the second surface and the second surface can be ruptured normally, so as to achieve pressure relief.

In some embodiments, the distance from the bottom surface of the score groove closest to the second surface to the second surface is H1, and H1 meets a relational expression $H1<0.5$ mm.

In the above technical scheme, the distance from the bottom surface of the score groove closest to the second surface to the second surface is less than 0.5 mm, so that the thickness of the part between the bottom surface of the score groove closest to the second surface and the second surface is small, which makes it easier to rupture for pressure relief.

In some embodiments, the depth of the score groove arranged on the first surface is H2, and H2 meets a relational expression $H2<1$ mm.

In the above technique solution, the depth of the score groove arranged on the first surface is less than 1 mm, so that the depth of the score groove at the outermost side of the pressure relief portion is small, which reduces the forming force received by the pressure relief portion in the forming process of the score groove, and reduces the risk of generating cracks in the pressure relief portion.

In some embodiments, the depth of a score groove between the score groove closest to the second surface and the score groove arranged on the first surface is H3, and H3 meets the relational expression $H3<1.5$ mm.

In the above technique solution, the depth of a score groove between the score groove closest to the second surface and the score groove arranged on the first surface is less than 1.5 mm, so that on the pressure relief portion, except for the score groove closest to the second surface and the score groove arranged on the first surface, the depth other score grooves is small, which reduces the forming force received by the pressure relief portion during the forming process and reduces the risk of generating cracks in the pressure relief portion.

In some embodiments, an accommodating space is formed inside the pressure relief body, the pressure relief body has a plurality of walls forming the accommodating space, the accommodating space is used for accommodating the electrode assembly, and one wall of the plurality of walls is provided with the pressure relief portion.

In the above technical scheme, the plurality of walls of the pressure relief body jointly form an accommodating cavity used for accommodating the electrode assembly, and one wall of the plurality of walls is formed with the pressure relief portion, so that the pressure relief apparatus has both an accommodating function for accommodating the electrode assembly and a pressure relief function.

In some embodiments, the plurality of walls include a peripheral wall and a bottom wall, the peripheral wall is arranged around an edge of the bottom wall, the peripheral wall and the bottom wall together jointly form the accommodating space, and the bottom wall is provided with the pressure relief portion.

In the above technique solution, the bottom wall of the pressure relief body is provided with the pressure relief portion, so that the bottom wall has a good pressure relief function.

In some embodiments, the peripheral wall and the bottom wall are of an integrally molded structure.

In the above technical scheme, because the bottom wall is provided with a pressure relief portion, the peripheral wall and the bottom wall are of an integrally molded structure into a structure, so that the peripheral wall and the bottom wall having the pressure relief function have good firmness, and this integrated design can simplify the forming process to reduce production costs.

In some embodiments, the first surface is an outer surface of the bottom wall.

In the above technique solution, the first surface is the outer surface of the bottom wall, which is convenient to process score grooves on the pressure relief body.

In a second aspect, a battery cell is provided in an embodiment of the present application, and includes the pressure relief apparatus according to any embodiment of the first aspect.

In a third aspect, a battery includes: the battery cell according to any embodiment of the second aspect; and a box body configured to accommodate the battery cell.

In a fourth aspect, an electrical device is provided, including the battery provided in any embodiment of the third aspect.

In a fifth aspect, a manufacturing method for a pressure relief apparatus is provided in an embodiment of the present application, and the method includes: providing a pressure relief body, the pressure relief body including a pressure relief portion, the pressure relief portion having a first surface and a second surface opposite to each other in a thickness direction thereof; and sequentially processing a plurality of score grooves on the pressure relief portion in a direction from the first surface to the second surface, wherein in two adjacent score grooves in the thickness direction, a maximum width of a score groove far away from the first surface is less than a minimum width of a score groove close to the first surface.

In some embodiments, the sequentially processing a plurality of score grooves on the pressure relief portion in a direction from the first surface to the second surface includes: sequentially punching a plurality of score grooves on the pressure relief portion in the direction from the first surface to the second surface.

In the above technical solution, a plurality of score grooves are sequentially formed on the pressure relief portion in the direction from the first surface to the second surface by punching. The forming process is simple, which can reduce the punching force received by the pressure relief portion during punching of each level of score groove, and reducing the risk of generating cracks in the pressure relief portion.

In the sixth aspect, a manufacturing device for a pressure relief apparatus is provided in an embodiment of the present application, including: a first providing apparatus configured to provide a pressure relief body, the pressure relief body including a pressure relief portion, the pressure relief portion having a first surface and a second surface opposite to each other in a thickness direction thereof; and a processing apparatus configured to process a plurality of score grooves on the pressure relief portion in sequence in a direction from the first surface to the second surface, wherein in two adjacent score grooves in the thickness direction, a maximum width of a score groove far away from the first surface is less than a minimum width of a score groove close to the first surface.

DESCRIPTION OF DRAWINGS

To more clearly describe the technical solutions in embodiments of the present application, the drawings to be used in the embodiments will be briefly introduced below. It should be understood that the following drawings only show some embodiments of the present application, and therefore, they should not be regarded as a limitation to the scope. For those of ordinary skills in the art, other related drawings may also be obtained based on these drawings without making creative work.

Figures 1, 2:
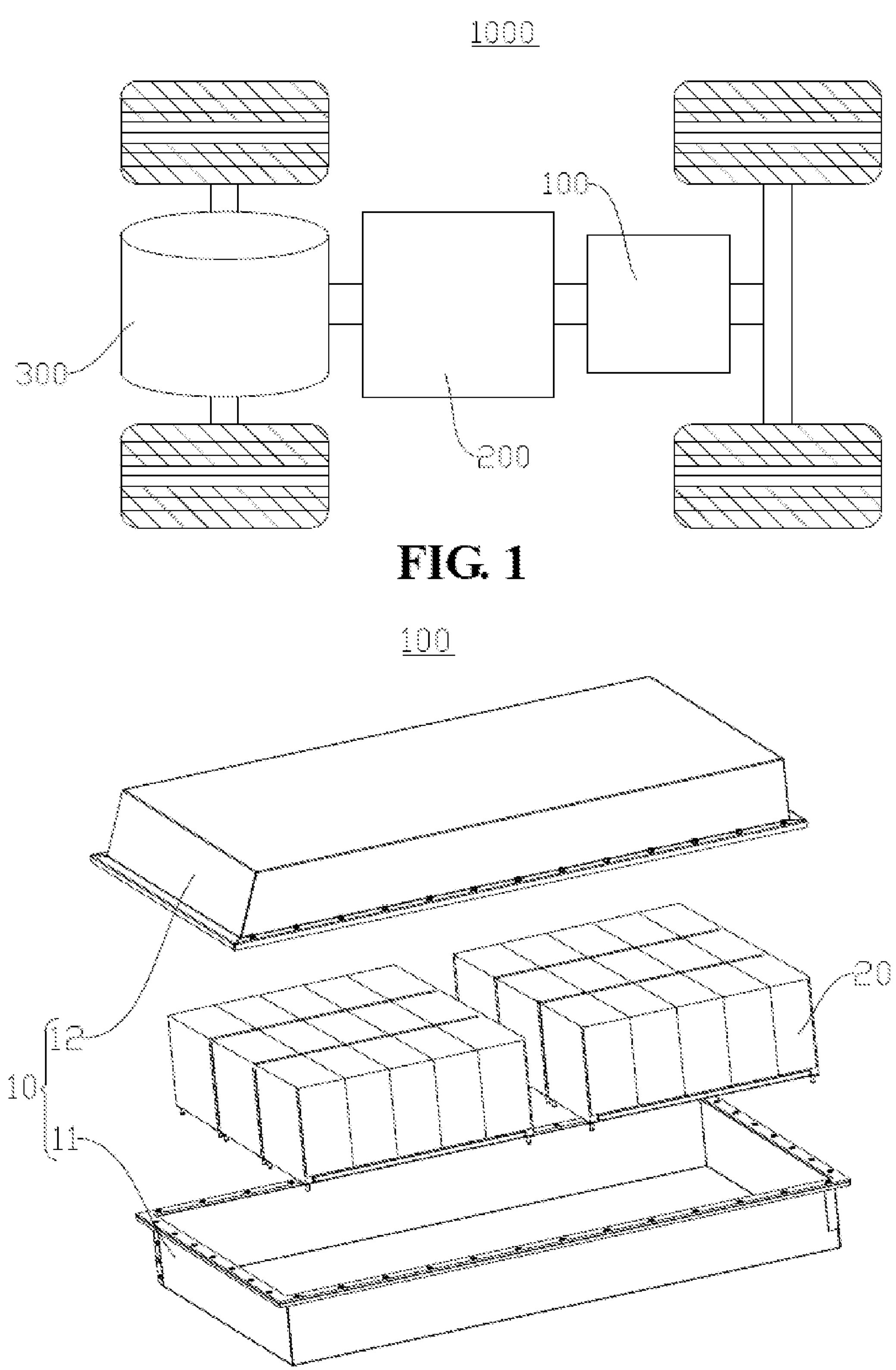
FIG. 1 is a schematic structural diagram of a vehicle provided by some embodiments of the present application.
FIG. 2 is a schematic structural diagram of a battery provided by some embodiments of the present application.

Reference numerals: 10—box body; 11—first part; 12—second part; 20—battery cell; 21—case; 22—electrode assembly; 221—positive tab; 222—negative tab; 23—end cap; 231—positive electrode terminal; 232—negative electrode terminal; 24—insulating member; 25—pressure relief apparatus; 251—pressure relief body; 2511—pressure relief portion; 2511*a*—first surface; 2511*b*—second surface; 2511*c*—opening region; 2512—peripheral wall; 2513—bottom wall; 252—score groove; 2521—first score groove; 2522—second score groove; 2522*a*—first groove section; 2522*b*—second groove section; 2522*c*—third groove section; 2522*d*—fourth groove section; 2523—third score groove; 253—notch groove; 26—current collecting member; 100—battery; 200—controller; 300—motor; 1000—vehicle; 2000—manufacturing device; 2100—providing apparatus; and 2200—processing apparatus.

DETAILED DESCRIPTION

In order to make the objects, technical solutions and advantages of embodiments of the present application clearer, the technical solutions in the embodiments of the present application will be clearly described below with reference to the drawings for the embodiments of the present application. Apparently, the described embodiments are some of, rather than all of, the embodiments of the present application. Based on the embodiments in the present application, all other embodiments obtained by those of ordinary skill in the art without creative effort fall within the scope of the present application.

Unless otherwise jointly formed, all technical and scientific terms used in the present application have the same meanings as those commonly understood by those skilled in the art to which the present application belongs. The terms used in the specification of the present application are merely for the purpose of describing specific embodiments, but are not intended to limit the present application. The terms "comprising" and "having" and any variations thereof in the specification and the claims of the present application as well as the foregoing description of the drawings are intended to cover non-exclusive inclusions. The terms "first", "second" and the like in the specification and the claims of the present application as well as the above drawings are used to distinguish different objects, rather than to describe a specific order or primary-secondary relationship.

Reference to "an embodiment" in the present application means that a particular feature, structure, or characteristic described in connection with the embodiment can be included in at least one embodiment of the present application. The appearance of this phrase in various places in the specification does not necessarily refer to the same embodiment, nor is it a separate or alternative embodiment that is mutually exclusive with other embodiments.

In the description of the present application, it should be noted that the terms "mounting", "connecting", "connection" and "attachment" should be understood in a broad sense, unless otherwise explicitly specified or jointly formed. For example, it may be a fixed connection, a detachable connection, or an integrated connection; and it may be a direct connection or an indirect connection through an intermediate medium, or may be a communication between the interior of two elements. For those of ordinary skill in the art, the specific meanings of the above terms in the present application can be understood according to specific situations.

In the present application, the term "and/or" is only an association relationship for describing associated objects, indicating that three relationships may exist. For example, A and/or B may represent three situations: A exists alone, both A and B exist, and B exists alone. In addition, the character "/" in the present application generally means that the associated objects before and after it are in an "or" relationship.

In the embodiments of the present application, the same reference numerals denote the same components, and for the sake of brevity, detailed descriptions of the same components are omitted in different embodiments. It should be understood that the thickness, length, width and other dimensions of various components in the embodiments of the present application shown in the drawings, as well as the overall thickness, length and width, etc. of the integrated device are only exemplary descriptions, and should not constitute any limitation to the present application.

The "plurality" in the present application refers to two or more (including two).

In the present application, battery cells may include a lithium-ion secondary battery, a lithium-ion primary battery, a lithium-sulfur battery, a sodium-lithium-ion battery, a sodium-ion battery, or a magnesium-ion battery, etc., which is not limited in the embodiments of the present application. The battery cell may be cylindrical, flat, rectangular, or in other shapes, which is also not limited in the embodiments of the present application. The battery cells are generally classified into three types according to encapsulating manners: cylindrical battery cells, rectangular battery cells, and pouch cells, which are not limited in the embodiments of the present application.

The battery mentioned in the embodiments of the present application refers to a single physical module including one or more battery cells to provide a higher voltage and capacity. For example, the battery mentioned in the present application may include a battery module, a battery pack, or the like. The battery typically includes a box body for encapsulating one or more battery cells. The box body can prevent liquids or other foreign matters from affecting charging or discharging of the battery cells.

The battery cells include electrode assemblies and electrolyte solution solutions, and each electrode assembly is composed of a positive electrode sheet, a negative electrode sheet and a separator. The battery cells work mainly relying on the movement of metal ions between the positive electrode sheet and the negative electrode sheet. The positive electrode sheet includes a positive electrode current collector and a positive electrode active material layer, a surface of the positive electrode current collector is coated with the positive electrode active material layer, the positive electrode current collector not coated with the positive electrode active material layer protrudes from the positive electrode collector already coated with the positive electrode active material layer, and the positive electrode current collector not coated with the positive electrode active material layer is used as a positive tab. Taking a lithium-ion battery as an example, the material of the positive electrode current collector may be aluminum, and the positive active material may be lithium cobalt oxide, lithium iron phosphate, ternary lithium, lithium manganate, or the like. The negative electrode sheet includes a negative electrode current collector and a negative electrode active material layer, a surface of the negative electrode current collector is coated with the negative electrode active material layer, the negative electrode current collector not coated with the negative electrode active material layer protrudes from the negative electrode collector already coated with the negative electrode active material layer, and the negative electrode current collector not coated with the negative electrode active material layer is used as a negative tab. The material of the negative electrode current collector may be copper, and the negative electrode active material may be carbon, silicon, or the like. In order to ensure that no fusing occurs when a large current passes, there are a plurality of positive tabs which are stacked together, and there are a plurality of negative tabs which are stacked together. A separator may be made from polypropylene (PP), polyethylene (PE), or the like. In addition, the electrode assembly may be of a wound structure or a laminated structure, which is not limited in the embodiments of the present application.

Many design factors, such as energy density, cycle life, discharge capacity, charge-discharge rate, and other performance parameters, should be considered in the development of the battery technology. In addition, the safety of the battery also needs to be taken into account.

A pressure relief apparatus on the battery cell has an important impact on the safety of the battery. For example, when a short circuit, overcharge, or the like occurs, it may cause thermal runaway inside the battery cell, resulting in a sudden rise in pressure or temperature. In this case, internal pressure and temperature can be relieved outward through the actuation of the pressure relief mechanism to prevent explosion and fire of the battery cell.

The inventor found that, in a general battery cell, the pressure relief apparatus will also relieve the pressure when the internal pressure of the battery cell is within a normal range, resulting in failure of the battery cell. The inventor has further researched and found that a pressure relief apparatus is generally provided with a score groove on a pressure relief body. In order to ensure that the pressure relief apparatus can normally relieve the pressure when the internal pressure or temperature of the battery cell reaches a threshold value, the score groove needs to be processed deeper. After the score groove on the pressure relief body is formed, cracks are easy to occur, and therefore, when the pressure inside the battery cell is in a normal range (does not reach the threshold value), the pressure relief apparatus may relieve the pressure.

In view of this, a pressure relief apparatus is provided in an embodiment of the present application, in which a plurality of score grooves are sequentially arranged on a pressure relief portion of a pressure relief body from a first surface to a second surface, and in two adjacent score grooves in a thickness direction of the pressure relief portion, a maximum width of the score groove away from the first surface is smaller than a minimum width of the score groove close to the first surface.

In such pressure relief apparatus, a multi-level score groove structure is adopted, which can reduce a forming force received by the pressure relief portion when forming each level of score groove, reduce the risk of generating cracks of the pressure relief portion. The pressure relief apparatus is less likely to fail due to the generation of cracks in a position of the pressure relief portion where the score groove is provided, and the long-term reliability of the pressure relief apparatus is improved.

The technical solutions described in the embodiments of the present application are applicable to a battery and an electrical device using the battery.

The electrical device may be a vehicle, a mobile phone, a portable device, a laptop, a ship, a spacecraft, an electric toy, an electric tool, and the like. The vehicle may be a fuel vehicle, a gas vehicle or a new energy vehicle. The new energy vehicle may be an all-electric vehicle, a hybrid vehicle, an range extended electric vehicle, or the like. The spacecraft includes airplanes, rockets, space shuttles, spaceships, and the like. The electric toy includes fixed or mobile electric toys, such as game consoles, electric car toys, electric ship toys and electric aircraft toys. The electric tool includes metal cutting electric tools, grinding electric tools, assembly electric tools and railway electric tools, such as electric drills, electric grinders, electric wrenches, electric screwdrivers, electric hammers, impact drills, concrete vibrators and electric planers. The embodiments of the present application do not impose special limitations on the above electrical device.

In the following embodiments, for convenience of description, the electrical device being a vehicle is taken as an example for description.

Referring to FIG. 1, which is a schematic structural diagram of vehicle 1000 provided by some embodiments of the present application. The interior of vehicle 1000 is provided with battery 100, and battery 100 may be arranged at the bottom or head or tail of vehicle 1000. The battery 100 may be used to supply power to the vehicle 1000, for example, the battery 100 may serve as an operating power source for the vehicle 1000.

Vehicle 1000 may further include controller 200 and motor 300, wherein controller 200 is configured to control battery 100 to power motor 300, for example, for the operating power demand when vehicle 1000 is starting, navigating, and driving.

In some embodiments of the present application, the battery 100 not only may serve as the operating power source of the vehicle 1000, but also may serve as a driving power source of the vehicle 1000, thus replacing or partially replacing fuel or natural gas to provide driving power for the vehicle 1000.

Referring to FIG. 2, which is a schematic structural diagram of battery 100 provided by some embodiments of the present application. Battery 100 includes box body 10 and battery cell 20, and box body 10 is configured to accommodate battery cell 20.

box body 10 is a component for accommodating battery cell 20, box body 10 provides a receiving space for battery cell 20, and box body 10 may have various structures. In some embodiments, box body 10 may include first part 11 and second part 12, and first part 11 and second part 12 cover each other to jointly form a receiving space for accommodating battery cell 20. First part 11 and second part 12 may have various shapes, such as a rectangular parallelepiped and a cylinder. First part 11 may be a hollow structure with one side open, and second part 12 may also be a hollow structure with one side open. The open side of second part 12 covers the open side of first part 11 to form box body 10 having a receiving space. It may also be possible that first part 11 is a hollow structure with one side open, second part 12 is a plate-like structure, and second part 12 covers the open side of first part 11 to form box body 10 with a receiving space. First part 11 and second part 12 may be sealed by a sealing element, and the sealing element may be a sealing ring, a sealant, or the like.

In the battery 100, there may be one or more battery cells 20. If there are the plurality of battery cells 20, the plurality of battery cells 20 may be connected in series or in parallel or in a mixed connection. The mixed connection means that the plurality of battery cells 20 are connected in both series and parallel. A plurality of battery cells 20 may be connected in series, in parallel, or in a mixed connection to form a battery module first, and then a plurality of battery modules may be connected in series or in parallel or mixed to form a whole, which is accommodated in box body 10. It is also possible that all battery cells 20 are directly connected in series, in parallel, or in a mixed connection to form a whole, and then the whole formed by all battery cells 20 is accommodated in box body 10.

In some embodiments, battery 100 may further include a bus component, and the plurality of battery cells 20 may be electrically connected through the bus component, so as to realize the series or parallel or mixed connection of the plurality of battery cells 20. The bus component may be a metal conductor, such as copper, iron, aluminum, stainless steel, and aluminum alloy.

Figure 3:
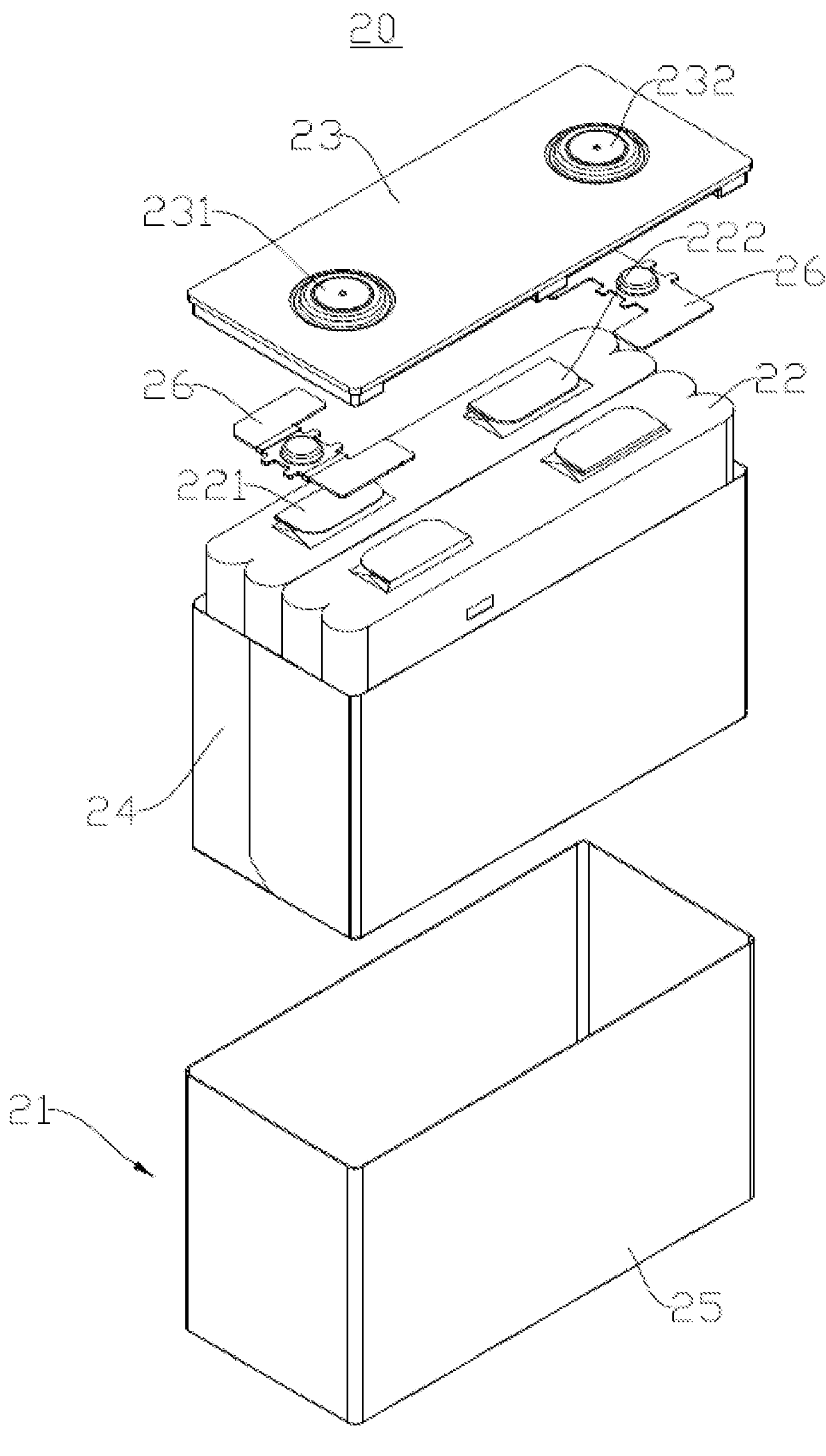
FIG. 3 is an exploded diagram of a battery cell provided by some embodiments of the present application.

Referring to FIG. 3, which is an exploded diagram of battery cell 20 provided by some embodiments of the present application. Battery cell 20 includes case 21, electrode assembly 22, end cap 23, insulating member 24, and pressure relief apparatus 25.

Case 21 is a component for accommodating electrode assembly 22, and case 21 may be a hollow structure with an opening formed at one end. The case 21 may be in various shapes, such as a cylinder and a cuboid. Case 21 may be made of various materials, such as copper, iron, aluminum, steel, and aluminum alloy.

There may be one or a plurality of electrode assemblies 22 in case 21. For example, as shown in FIG. 3, there are a plurality of electrode assemblies 22, and the plurality of electrode assemblies 22 are stacked in case 21.

Electrode assembly 22 is a component in battery cell 20 where an electrochemical reaction occurs. Electrode assembly 22 may include a positive electrode sheet, a negative electrode sheet, and a separator. Electrode assembly 22 may be a wound structure formed by winding a positive electrode sheet, a separator, and a negative electrode sheet, or a laminated structure formed by stacking a positive electrode sheet, a separator, and a negative electrode sheet.

The positive electrode sheet may include a positive electrode current collector and a positive active material layer coated on two opposite sides of the positive electrode current collector. The negative electrode sheet may include a negative electrode current collector and a negative active material layer coated on two opposite sides of the negative electrode current collector. Electrode assembly 22 has positive tab 221 and negative tab 222, positive tab 221 may be a part on the positive electrode sheet that is not coated with the positive active material layer, and negative tab 222 may be a part on the negative electrode sheet that is not coated with the negative active material layer.

end cap 23 is a component that covers the opening of case 21 to isolate the internal environment of battery cell 20 from the external environment. end cap 23 covers the opening of case 21, and end cap 23 and case 21 together jointly form a sealed space for accommodating electrode assembly 22, an electrolyte solution, and other components. The shape of end cap 23 may be adapted to the shape of case 21. For example, case 21 is a rectangular parallelepiped structure, and end cap 23 is a rectangular plate-shaped structure that matches case 21. For another example, case 21 is a cylindrical structure, and end cap 23 is a circular plate-shaped structure that matches case 21. The material of end cap 23 may also be various, for example, copper, iron, aluminum, steel, aluminum alloy, and the like. The material of end cap 23 and the material of case 21 may be the same or different.

An electrode terminal may be arranged on end cap 23, and the electrode terminal is used for being electrically connected to electrode assembly 22 to output electric energy of battery cell 20. The electrode terminal may include positive electrode terminal 231 and negative electrode terminal 232. Positive electrode terminal 231 is used for electrically connecting to positive tab 221, and negative electrode terminal 232 is used for electrically connecting to negative tab 222. Positive electrode terminal 231 and positive tab 221 may be directly connected or indirectly connected, and negative electrode terminal 232 and negative tab 222 may be directly connected or indirectly connected. For example, positive electrode terminal 231 is electrically connected to positive tab 221 through one current collecting member 26, and negative electrode terminal 232 is electrically connected to negative tab 222 through another current collecting member 26.

Insulating member 24 is a component that separates case 21 from electrode assembly 22, and insulating isolation of case 21 and electrode assembly 22 is realized by insulating member 24. Insulating member 24 is an insulating material, and insulating member 24 may be an insulating material such as plastic or rubber. For example, insulating member 24 circumferentially dads the outer circumference of electrode assembly 22. It is understandable when there are a plurality of electrode assemblies 22, insulating member 24 circumferentially clads the entire outer circumference of the plurality of electrode assemblies 22.

Pressure relief apparatus 25 is a component for relieving the pressure inside battery cell 20. When the pressure or temperature inside battery cell 20 reaches a threshold value, pressure relief apparatus 25 relieves the pressure inside battery cell 20. Pressure relief apparatus 25 may be a component arranged on end cap 23, or case 21 may act as pressure relief apparatus 25. The specific structure of pressure relief apparatus 25 will be described in detail below with reference to the accompanying drawings.

Figure 4:
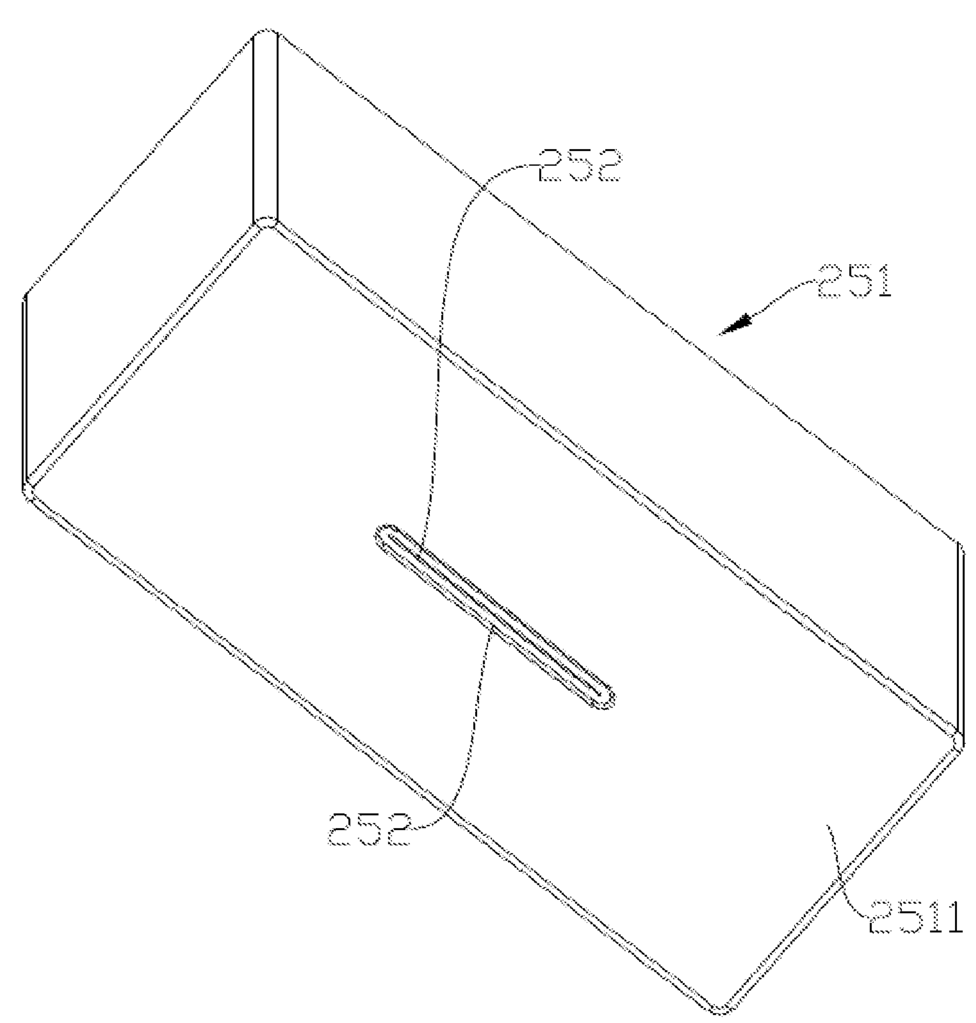
FIG. 4 is a schematic structural diagram of a pressure relief apparatus provided by some embodiments of the present application.
Figure 5:
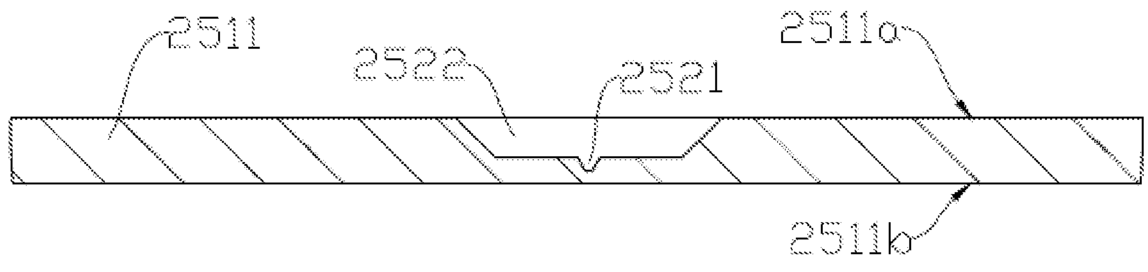
FIG. 5 is a cross-sectional diagram of a pressure relief portion shown in FIG. 4.

Referring to FIG. 4 and FIG. 5, FIG. 4 is a schematic structural diagram of pressure relief apparatus 25 provided by some embodiments of the present application, and FIG. 5 is a sectional diagram of pressure relief portion 2511 shown in FIG. 4, pressure relief apparatus 25 includes pressure relief body 251 and a plurality of score grooves 252. Pressure relief body 251 includes pressure relief portion 2511 having first surface 2511*a* and second surface 2511*b* opposite to each other in a thickness direction thereof. The plurality of score grooves 252 are sequentially arranged on pressure relief portion 2511 in a direction from first surface 2511*a* to second surface 2511*b*, and in two adjacent score grooves 252 in the thickness direction of pressure relief portion 2511, a maximum width of score groove 252 away from first surface 2511*a* is less than a minimum width of score groove 252 close to first surface 2511*a*.

In two adjacent score grooves 252 in the thickness direction of pressure relief portion 2511, the maximum width of score groove 252 away from first surface 2511*a* is smaller than the minimum width of score groove 252 close to first surface 2511*a*. In other words, the widths of the plurality of score grooves 252 gradually decrease in the direction from first surface 2511*a* to second surface 2511*b*. The maximum width of score groove 252 away from first surface 2511*a* and the minimum width of score groove 252 near first surface 2511*a* are the size of two adjacent score grooves 252 in the same direction. The maximum width of score groove 252 away from first surface 2511*a* does not limit that the width of score groove 252 away from first surface 2511*a* in two adjacent score groove 252 is gradually varied. In a case that the width of score groove 252 away from first surface 2511*a* does not change in the thickness direction of pressure relief portion 2511, the width of score groove 252 away from first surface 2511*a* may also be referred to as the maximum width. The minimum width of score groove 252 close to first surface 2511*a* does not limit that the width of score groove 252 close to first surface 2511*a* in two adjacent score grooves 252 is gradually varied. In a case that the width of score groove 252 close to first surface 2511*a* does not change in the thickness direction of pressure relief portion 2511, the width of score groove 252 close to first surface 2511*a* may also be referred to as the minimum width. In other words, in a case that the width of score groove 252 does not change in the thickness direction of pressure relief portion 2511, "in two adjacent score grooves 252 in the thickness direction of pressure relief portion 2511, the maximum width of score groove 252 away from first surface 2511*a* is smaller than the minimum width of score groove 252 close to first surface 2511*a*" may be understood as "in two adjacent score grooves 252 in the thickness direction of pressure relief portion 2511, the width of score groove 252 away from first surface 2511*a* is smaller than the width of score groove 252 close to first surface 2511*a*."

Pressure relief portion 2511 may be provided with two, three, four, or more score grooves 252 sequentially in its thickness direction. The plurality of score grooves 252 on pressure relief portion 2511 may be formed by various methods, such as punching and milling. Taking the forming of the plurality of score grooves 252 by punching as an example, the plurality of score grooves 252 may be punched on pressure relief portion 2511 sequentially in the direction from first surface 2511*a* to second surface 2511*b*. For example, if pressure relief portion 2511 is provided with three score grooves 252 sequentially in the thickness direction, first score groove 252 may be punched on first surface

2511*a*, then second score groove 252 may be punched on a bottom surface of first score groove 252, and third score groove 252 may be punched on a bottom surface of second score groove 252.

First surface 2511*a* and second surface 2511*b* of pressure relief portion 2511 are the two opposite surfaces of pressure relief portion 2511 in its thickness direction, and a distance between first surface 2511*a* and second surface 2511*b* is the thickness of pressure relief portion 2511.

Pressure relief body 251 may be a component mounted on end cap 23, for example, pressure relief body 251 is a rupture disk mounted on end cap 23. Pressure relief body 251 may also be case 21 for accommodating electrode assembly 22. A part of pressure relief body 251 may be pressure relief portion 2511, or the entire pressure relief body 251 may be pressure relief portion 2511. For example, pressure relief body 251 is a rupture disk installed on end cap 23, and pressure relief body 251 may be pressure relief portion 2511 as a whole. For another example, pressure relief body 251 is case 21 for accommodating electrode assembly 22, and pressure relief portion 2511 may be a wall or a part of a wall of case 21.

In pressure relief apparatus 25, since pressure relief portion 2511 is provided with a plurality of score grooves 252, the plurality of score grooves 252 are sequentially arranged on pressure relief portion 2511 in the direction from first surface 2511*a* to second surface 2511*b* of pressure relief portion 2511, and in two adjacent score grooves 252 in the thickness direction of pressure relief portion 2511, a maximum width of score groove 252 away from first surface 2511*a* is smaller than a minimum width of score groove 252 close to first surface 2511*a*. Pressure relief apparatus 25 of this structure adopts a multi-level score groove 252 structure, which can reduce a forming force received by pressure relief portion 2511 during forming of each level of score groove 252, and reduce the risk of generating cracks in pressure relief portion 2511. Pressure relief apparatus 25 is less likely to fail due to cracks in pressure relief portion 2511 at the position where score grooves 252 are provided, thereby improving the long-term reliability of pressure relief apparatus 25.

When forming a plurality of score grooves 252 on pressure relief portion 2511, score grooves 252 may be formed pole by pole on pressure relief portion 2511 in the direction from first surface 2511*a* to second surface 2511*b*, and the forming depth of each pole of score groove 252 is relatively shallow, so that pressure relief portion 2511 receives a small forming force, which not only reduces the risk of generating cracks in pressure relief portion 2511, but also improves the flatness of first surface 2511*a*.

In addition, the widths of the plurality of score grooves 252 gradually increase in the direction from second surface 2511*b* to first surface 2511*a*, and therefore, pressure relief portion 2511 may form large cracks after ruptured at the position of score grooves 252, thereby having a good pressure relief effect.

In some embodiments, still referring to FIG. 5, the plurality of score grooves 252 include first score groove 2521 and second score groove 2522 extending in the same direction, and first score groove 2521 is arranged on a bottom surface of second score groove 2522.

The plurality of score grooves 252 include first score groove 2521 and second score groove 2522. In other words, among the plurality of score grooves 252, one score groove 252 is first score groove 2521, and another score groove 252 is second score groove 2522. Of course, there may be only two score grooves 252 in the plurality of score grooves 252, and two score grooves 252 are first score groove 2521 and second score groove 2522, respectively.

The extension directions of first score groove 2521 and second score groove 2522 are the same, that is, a length direction of first score groove 2521 is consistent with a length direction of second score groove 2522. A bottom surface of second score groove 2522 refers to a surface closest to second surface 2511*b* among groove wall surfaces of second score groove 2522, that is, a surface connected to a groove side surface of second score groove 2522. First score groove 2521 is arranged on the bottom surface of second score groove 2522, and it is understandable that in the thickness direction of pressure relief portion 2511, first score groove 2521 is closer to second surface 2511*b* than second score groove 2522. First score groove 2521 is recessed from the bottom surface of second score groove 2522 in a direction close to second surface 2511*b*. The bottom surface of second score groove 2522 may be provided with one first score groove 2521, or may be provided with a plurality of first score grooves 2521. For example, one first score groove 2521 is arranged on the bottom surface of second score groove 2522, that is, one second score groove 2522 is correspondingly provided with one first score groove 2521. Of course, first score groove 2521 may be arranged on the bottom surface of second score groove 2522 and located at a middle position of second score groove 2522 in a width direction.

For example, as shown in FIG. 5, in a case that the plurality of score grooves 252 only include two score grooves 252, second score groove 2522 is arranged on first surface 2511*a*, that is, second score groove 2522 is recessed from first surface 2511*a* to the direction close to second surface 2511*b*. The distance between the two opposite groove side surfaces of second score groove 2522 in the width direction thereof gradually decreases in the direction from first surface 2511*a* to second surface 2511*b*, that is, the width of second score groove 2522 gradually decreases in the direction from first surface 2511*a* to second surface 2511*b*. Of course, the two opposite groove side surfaces of second score groove 2522 in the width direction thereof may be inclined surfaces. Similarly, the distance between the two opposite groove side surfaces of first score groove 2521 in the width direction thereof gradually decreases in the direction from first surface 2511*a* to second surface 2511*b*, that is, the width of first score groove 2521 gradually decreases in the direction from first surface 2511*a* to second surface 2511*b*. Of course, the two opposite groove side surfaces of first score groove 2521 in the width direction thereof may also be inclined surfaces.

In the present embodiment, the extension direction of first score groove 2521 is consistent with the extension direction of second score groove 2522, and first score groove 2521 is arranged on the bottom surface of second score groove 2522. Therefore, on the one hand, the structure facilitates formation of first score groove 2521 and ensures the length of first score groove 2521, and on the other hand, it can be ensured that the maximum width of first score groove 2521 is smaller than the minimum width of second score groove 2522.

Figures 6, 7:
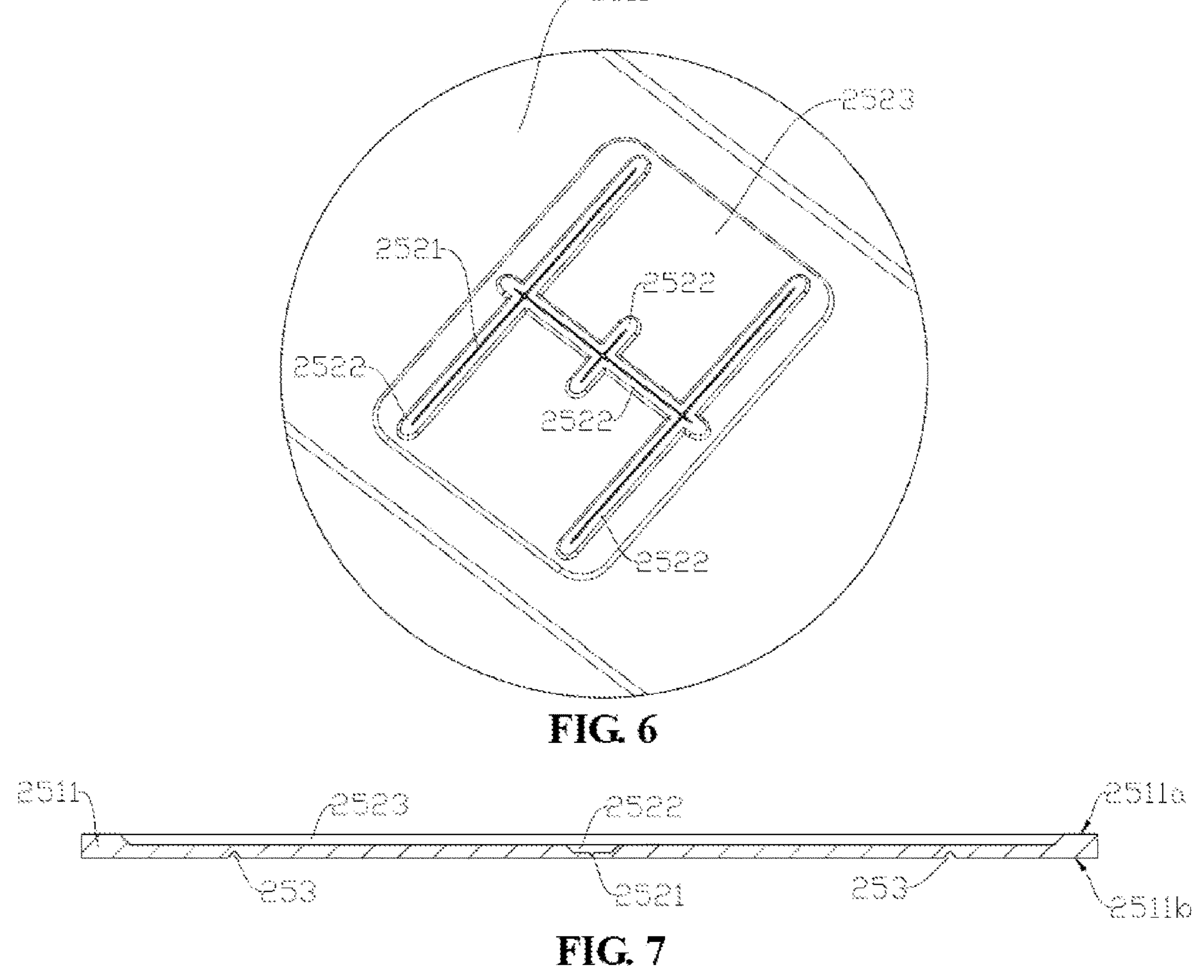
FIG. 6 is a local diagram of a pressure relief apparatus according to some further embodiments of the present application.
FIG. 7 is a cross-sectional diagram of a pressure relief portion shown in FIG. 6.

In some embodiments, referring to FIG. 6 and FIG. 7, FIG. 6 is a partial diagram of pressure relief apparatus 25 according to some other embodiments of the present application, and FIG. 7 is a sectional diagram of pressure relief portion 2511 shown in FIG. 6. The plurality of score grooves 252 further include third score groove 2523, third score groove 2523 is arranged on first surface 2511 *a*, and second score grooves 2522 is arranged on a bottom surface of third score grooves 2523.

The plurality of score grooves 252 further include third score groove 2523. It is understandable that the plurality of score grooves 252 only include first score grooves 2521, second score grooves 2522, and third score groove 2523, or may include another score groove 252 in addition to first score groove 2521, second score groove 2522, and third score groove 2523. For example, score groove 252 is further arranged on the bottom surface of first score groove 2521.

Third score groove 2523 is arranged first surface 2511*a*, that is, second score groove 2522 is recessed from first surface 2511*a* to the direction close to second surface 2511*b*. Third score groove 2523 is score groove 252 closest to first surface 2511*a*. The bottom surface of third score groove 2523 refers to a surface closest to second surface 2511*b* among groove wall surfaces of third score groove 2523, that is, a surface connecting with a groove side surface of third score groove 2523. Second score groove 2522 is arranged on the bottom surface of third score groove 2523. It is understandable that in the thickness direction of pressure relief portion 2511, second score groove 2522 is closer to second surface 2511*b* than third score groove 2523, second score groove 2522 is recessed from the bottom surface of third score groove 2523 in the direction close to second surface 2511*b*. The bottom surface of third score groove 2523 may be provided with one second score groove 2522, or even a plurality of second score grooves 2522.

In the above technical scheme, the plurality of score grooves 252 further include third score groove 2523 arranged on first surface 2511*a*, and second score groove 2522 is arranged on the bottom surface of third score groove 2523. In other words, pressure relief portion 2511 is provided with three levels of score grooves 252 to ensure that the forming force received by pressure relief portion 2511 will not be too large when forming each level of score groove 252, thereby reducing the risk of generating cracks in pressure relief portion 2511.

In some embodiments, still referring to FIG. 6, the bottom surface of third score groove 2523 is provided with a plurality of second score grooves 2522.

The shape of third score groove 2523 may be various, for example, third score groove 2523 is a circular groove, a rectangular groove, and the like. For example, in FIG. 6, third score groove 2523 is a rectangular groove.

The plurality of second score grooves 2522 arranged on the bottom surface of third score groove 2523 may be arranged in various manners, for example, the plurality of second score grooves 2522 are arranged in parallel. For another example, as shown in FIG. 6, the plurality of second score grooves 2522 form an approximately "H"-shaped structure.

In the present embodiment, the bottom surface of third score groove 2523 is provided with a plurality of second score grooves 2522, so that pressure relief portion 2511 may be ruptured at the position of each second score groove 2522 to achieve pressure relief, which has a better pressure relief effect and increases the pressure relief rate. In addition, one third score groove 2523 corresponds to a plurality of second score grooves 2522, and therefore, the forming process can be simplified and the forming cost can be reduced.

Figure 8:
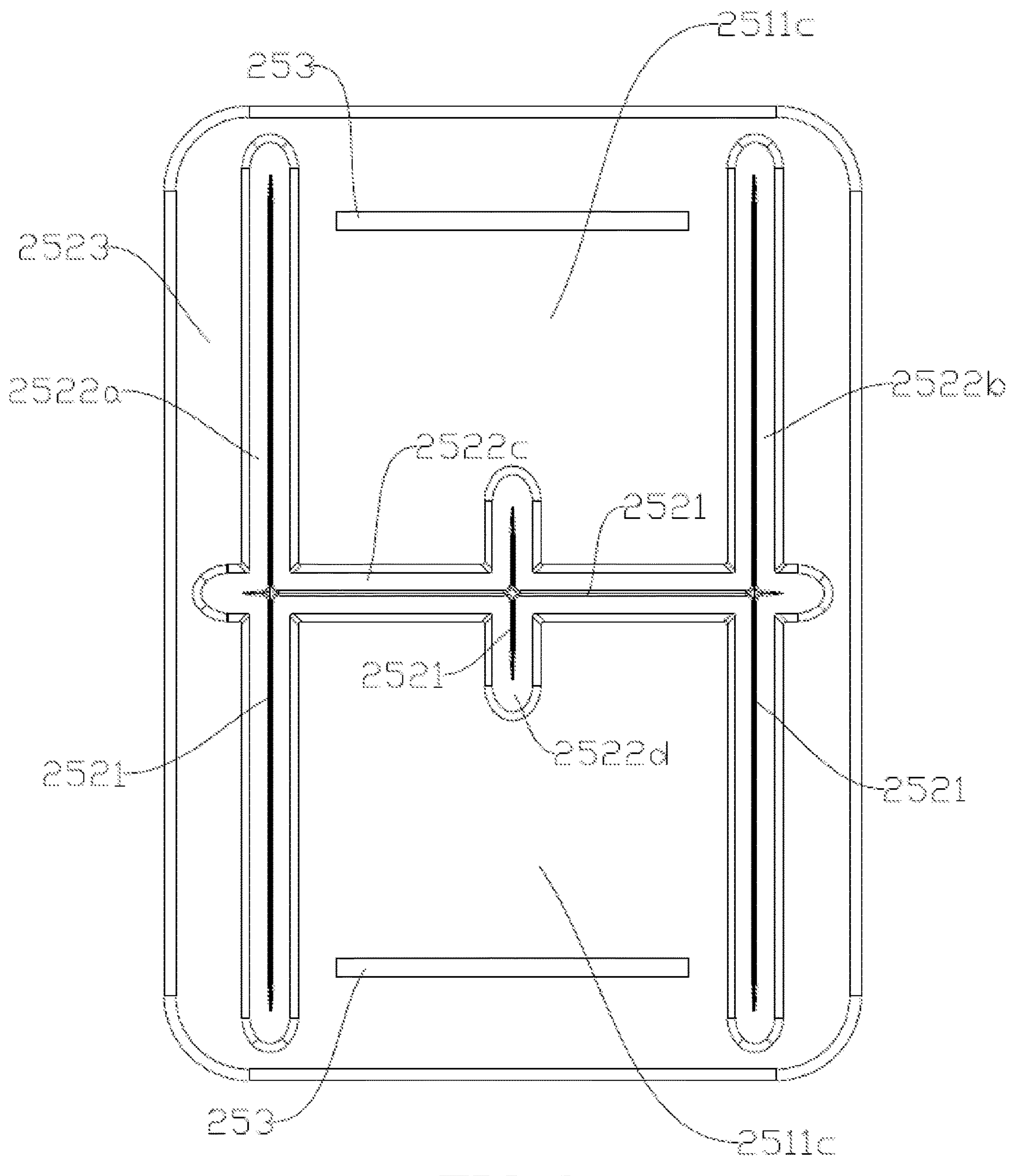
FIG. 8 is a positional relationship diagram of a first score groove, a second score groove, and a third score groove shown in FIG. 6.

In some embodiments, referring to FIG. 8, which is a positional relationship diagram of first score groove 2521, second score groove 2522, and third score groove 2523 shown in FIG. 6. A plurality of second score grooves 2522 include first groove section 2522*a*, second groove section 2522*b*, and third groove section 2522*c*, first groove section 2522*a* and second groove section 2522*b* are arranged at an interval, and first groove section 2522*a* and second groove section 2522*b* both intersect with third groove section 2522*c*. Pressure relief portion 2511 includes opening region 2511*c* jointly formed by first groove section 2522*a*, second groove section 2522*b*, and third groove section 2522*c*. Opening region 2511*c* is configured to be open with first groove section 2522*a*, second groove section 2522*b*, and third groove section 2522*c* as boundaries.

The plurality of second score grooves 2522 include first groove section 2522*a*, second groove section 2522*b*, and third groove section 2522*c*. In other words, among the plurality of second score grooves 2522, the first second score groove 2522 is first groove section 2522*a*, the next second score groove 2522 is second groove section 2522*b*, and the further second score groove 2522 is third groove section 2522*c*. Of course, there may be only three second score grooves 2522 in the plurality of second score grooves 2522, and three second score grooves 2522 are first groove section 2522*a*, second groove section 2522*b*, and third groove section 2522*c*, respectively.

Opening region 2511*c* is a region of pressure relief portion 2511 jointly formed by first groove section 2522*a*, second groove section 2522*b*, and third groove section 2522*c*. There may be one or two opening regions 2511*c* jointly formed by first groove section 2522*a*, second groove section 2522*b*, and third groove section 2522*c*. For example, first groove section 2522*a*, second groove section 2522*b*, and third groove section 2522*c* form an approximately "open rectangular"-shaped structure, and there is one opening region 2511*c*. for another example, first groove section 2522*a*, second groove section 2522*b* and, third groove section 2522*c* form an approximately "H"-shaped structure, and there are two open regions 2511*c*.

Opening region 2511*c* is the region where pressure relief portion 2511 relieves the pressure. For battery cell 20, when the internal pressure or temperature of battery cell 20 reaches the threshold, the part of pressure relief portion 2511 in opening region 2511*c* will be open with the first groove section 2522*a*, second groove section 2522*b*, and third groove section 2522*c* as boundaries to achieve pressure relief.

The plurality of second score grooves 2522 are arranged on the bottom surface of third score grooves 2523, and first groove section 2522*a*, second groove section 2522*b*, and third groove section 2522*c* are all arranged on the bottom surface of third score groove 2523; therefore, opening region 2511*c* is located in a range of third score groove 2523, and third score groove 2523 can provide an escape space in a process of the part of pressure relief portion 2511 located in opening region 2511*c* opening with first groove section 2522*a*, second groove section 2522*b*, and third groove section 2522*c* as boundaries.

In the present embodiment, because first groove section 2522*a* and second groove section 2522*b* are arranged at an interval, first groove section 2522*a* and second groove section 2522*b* both intersect with third groove section 2522*c*, and first groove section 2522*a*, second groove section 2522*b*, and third groove section 2522*c* jointly jointly form opening region 2511*c*. This structure enables pressure relief portion 2511 to open the part located in opening region 2511*c* to relieve the pressure after pressure relief portion 2511 is ruptured in positions of first groove section 2522*a*, second groove section 2522*b*, and third groove section 2522*c*, which increases the pressure relieve area of pressure relief portion 2511 and improves the pressure relieve rate of pressure relief portion 2511.

In some embodiments, still referring to FIG. 8, the plurality of second score grooves 2522 further include fourth groove section 2522*d*, and in an extension direction of third groove section 2522*c*, fourth groove section 2522*d* is located between first groove section 2522*a* and second groove section 2522*b*, and fourth groove section 2522*d* intersects with third groove section 2522*c*.

The plurality of second score grooves 2522 include fourth groove section 2522*d*, and it is understandable that the plurality of second score grooves 2522 include only first groove section 2522*a*, second groove section 2522*b*, third groove section 2522*c*, and fourth groove section 2522*d*, or may also include another groove section in addition to first groove section 2522*a*, second groove section 2522*b*, third groove section 2522*c*, and fourth groove section 2522*d*. For example, fourth groove section 2522*d* may be parallel to first groove section 2522*a* and second groove section 2522*b*, and perpendicular to third groove section 2522*c*.

In the present embodiment, fourth groove section 2522*d* between first groove section 2522*a* and second groove section 2522*b* intersects with third groove section 2522*c*. Pressure relief portion 2511 has a more concentrated stress at the intersection of third groove section 2522*c* and fourth groove section 2522*d* and is easier to rupture, so that pressure relief portion 2511 ruptures along third groove section 2522*c* from the intersection of third groove section 2522*c* and fourth groove section 2522*d* during the pressure relief process, and at After third groove section 2522*c* is ruptured, and ruptures along first groove section 2522*a* and second groove section 2522*b*, thereby achieving rapid pressure relief.

In some implementations, the depth of first groove section 2522*a* is equal to the depth of second groove section 2522*b*, the depth of third groove section 2522*c* is equal to the depth of fourth groove section 2522*d*, and the depth of first groove section 2522*a* is less than the depth of third groove section 2522*c*, so that pressure relief portion 2511 is more likely to rupture along third groove section 2522*c* from the intersection of third groove section 2522*c* and fourth groove section 2522*d* during the pressure relief. In some other embodiments, the depth of first groove section 2522*a*, the depth of second groove section 2522*b*, and the depth of third groove section 2522*c* are all smaller than the depth of fourth groove section 2522*d*, which may also ensure that the pressure portion is more likely to rupture along third groove section 2522*c* from the intersection of third groove section 2522*c* and fourth groove section 2522*d*.

In some embodiments, in the extension direction of third groove section 2522*c*, a distance from the intersection of fourth groove section 2522*d* and third groove section 2522*c* to first groove section 2522*a* is equal to a distance from the intersection of fourth groove section 2522*d* and third groove section 2522*c* to second groove section 2522*b*.

In the extension direction of third groove section 2522*c*, the distance from the intersection of fourth groove section 2522*d* and third groove section 2522*c* to first groove section 2522*a* is the length of the part of third groove section 2522*c* between fourth groove section 2522*d* and first groove section 2522*a*. In the extension direction of third groove section 2522*c*, the distance from the intersection of fourth groove section 2522*d* and third groove section 2522*c* to second groove section 2522*b* is the length of the part of third groove section 2522*c* between fourth groove section 2522*d* and second groove section 2522*b*.

In the present embodiment, the distance from the intersection of fourth groove section 2522*d* and third groove section 2522*c* to first groove section 2522*a* is equal to the distance from the intersection of fourth groove section 2522*d* and third groove section 2522*c* to second groove section 2522*b*, so that pressure relief portion 2511 can rupture along first groove section 2522*a* and second groove section 2522*b* simultaneously after being ruptured along third groove section 2522*c* at the intersection of fourth groove section 2522*d* and third groove section 2522*c*.

In some embodiments, still referring to FIG. 8, first groove section 2522*a*, second groove section 2522*b*, and third groove section 2522*c* jointly form two opening regions 2511*c*, and two opening regions 2511*c* are respectively located in both sides of third groove section 2522*c*.

First groove section 2522*a*, second groove section 2522*b*, and third groove section 2522*c* together jointly form two opening regions 2511*c*, and first groove section 2522*a*, second groove section 2522*b*, and third groove section 2522*c* may constitute an approximately "H"-shaped structure. Two opening regions 2511*c* are located on both sides of third groove section 2522*c*, respectively, so that two opening regions 2511*c* are bounded by third groove section 2522*c*. After pressure relief portion 2511 ruptures at the position of third groove section 2522*c*, two opening regions 2511*c* will be open in a split form along first groove section 2522*a* and second groove section 2522*b*, for achieving pressure relief.

It should be noted that, no matter whether fourth groove section 2522*d* is included in the plurality of second score grooves 2522, first groove section 2522*a*, second groove section 2522*b*, and third groove section 2522*c* can jointly form two opening regions 2511*c*.

In the present embodiment, first groove section 2522*a*, second groove section 2522*b*, and third groove section 2522*c* jointly form two opening regions 2511*c*, and two opening regions 2511*c* are located on both sides of third groove section 2522*c*, respectively; therefore, during the pressure relief of pressure relief portion 2511, the parts of pressure relief portion 2511 in the two pressure relief regions can be opened in a split manner for pressure relief, which can effectively improve the pressure relief rate of pressure relief portion 2511.

In some embodiments, still referring to FIG. 7 and FIG. 8, second surface 2511*b* is provided with notch groove 253 that is at least partially located in opening region 2511*c*, and in the extension direction of first groove section 2522*a*, there is a distance from notch groove 253 to third groove section 2522*c*.

Second surface 2511*b* is provided with notch groove 253 that is at least partially located in opening region 2511*c*. It is understandable that notch groove 253 is recessed from second surface 2511*b* in a direction facing first surface 2511*a*, and notch groove 253 is at least partially located in opening region 2511*c*. Of course, notch groove 253 may be completely located in opening region 2511*c*, or notch groove 253 may be partially located in opening region 2511*c*.

Notch groove 253 may extend in the extension direction of third groove section 2522*c*, so that notch groove 253 is parallel to third groove section 2522*c*.

In the embodiment in which first groove section 2522*a*, second groove section 2522*b*, and third groove section 2522*c* jointly jointly form opening region 2511*c*, first surface 2511*a* may be correspondingly provided with one notch groove 253. Referring to FIG. 7 and FIG. 8, in the embodiment in which first groove section 2522*a*, second groove section 2522*b*, and third groove section 2522*c* jointly jointly form two opening regions 2511*c*, first surface 2511*a* may be correspondingly provided with two notch grooves 253, one opening region 2511*c* being correspondingly provided with one notch groove 253.

In the present embodiment, there is a distance from notch groove 253 to third groove section 2522*c* in the extension direction of first groove section 2522*a*, and at least a part of notch groove 253 is located in opening region 2511*c*, so that during the pressure relief of pressure relief portion 2511, a part of pressure relief portion 2511 located in opening region 2511*c* may be turned over with the position of pressure relief portion 2511 located in notch groove 253 as an axis, and is easier to open for pressure relief.

In some embodiments, a distance between first surface 2511*a* and second surface 2511*b* is H0, a distance from the bottom surface of score groove 252 closest to second surface 2511*b* to second surface 2511*b* is H1, and H0 and H1 meet a relational expression: $H1/H0<0.2$.

The distance between first surface 2511*a* and second surface 2511*b* is the thickness of pressure relief portion 2511. The distance from the bottom surface of score groove 252 closest to second surface 2511*b* to second surface 2511*b* is the thickness of the part between the bottom surface of score groove 252 closest to second surface 2511*b* and second surface 2511*b*. In the embodiment in which the plurality of score grooves 252 include only first score groove 2521, second score groove 2522, and third score groove 2523, first score groove 2521 is score groove 252 closest to second surface 2511*b*.

In the present embodiment, a ratio of the distance from the bottom surface of score groove 252 closest to second surface 2511*b* to second surface 2511*b* to the distance from first surface 2511*a* to second surface 2511*b* is less than 0.2, so that the thickness of the part between the bottom surface of score groove 252 of the second surface 2511*b* and second surface 2511*b* accounts for a small proportion of the total thickness of pressure relief portion 2511, so that the part between the bottom surface of score groove 252 closest to second surface 2511*b* and second surface 2511*b* can be ruptured normally to achieve pressure relief.

In some embodiments, the distance from the bottom surface of score groove 252 closest to second surface 2511*b* to second surface 2511*b* is H1, and H1 meets a relational expression $H1<0.5$ mm.

In the present embodiment, the distance from the bottom surface of score groove 252 closest to second surface 2511*b* to second surface 2511*b* is less than 0.5 mm, so that the thickness of the part between the bottom surface of score groove 252 closest to second surface 2511*b* and second surface 2511*b* is small, and is easy to rupture for pressure relief.

In some embodiments, the depth of score groove 252 arranged on first surface 2511*a* is H2, and H2 meets a relational expression $H2<1$ mm.

The depth of score groove 252 arranged on first surface 2511*a* is the distance from the bottom surface of score groove 252 arranged on first surface 2511*a* to first surface 2511*a*. In the embodiment in which the plurality of score grooves 252 include first score groove 2521, second score groove 2522, and third score groove 2523, third score groove 2523 is score groove 252 arranged on first surface 2511*a*.

In the present embodiment, the depth of score groove 252 arranged on first surface 2511*a* is less than 1 mm, so that the depth of score groove 252 on the outermost side of pressure relief portion 2511 is small, thereby reducing the forming force received by pressure relief portion 2511 during the forming of score groove 252, and reducing the risk of generating cracks in pressure relief portion 2511.

In some embodiments, the depth of score groove 252 between score groove 252 closest to second surface 2511*b* and score groove 252 arranged on first surface 2511*a* is H3, and H3 meets a relational expression $H3<1.5$ mm.

In the present embodiment, the plurality of score grooves 252 include at least three score grooves 252. Taking the plurality of score grooves 252 including only first score groove 2521, second score groove 2522, and third score groove 2523 as an embodiment, score groove 252 closest to second surface 2511*b* is first score groove 2521, score groove 252 arranged on first surface 2511*a* is third score groove 2523, and score groove 252 between score groove 252 closest to second surface 2511*b* and score groove 252 arranged on first surface 2511*a* is second score groove 2522.

In the present embodiment, the depth of score groove 252 between score groove 252 closest to second surface 2511*b* and score groove 252 arranged on first surface 2511*a* is less than 1.5 mm, so that on pressure relief portion 2511, the depth of score groove 252 except score groove 252 closest to second surface 2511*b* and score groove 252 arranged on first surface 2511*a* is small, which reduces the forming force received by pressure relief portion 2511 during the forming, and reduces the risk of generating cracks in pressure relief portion 2511.

Figures 9, 10:
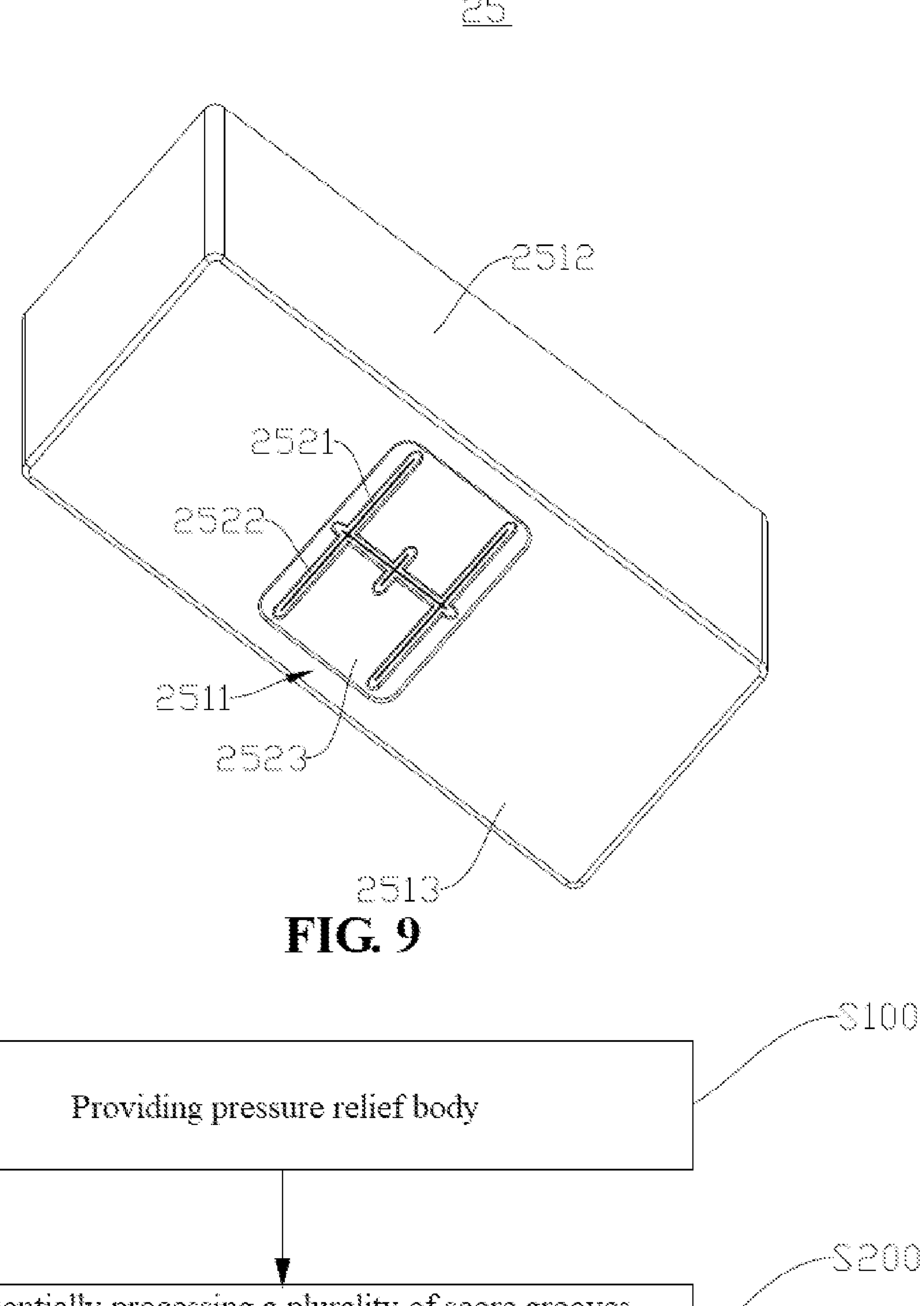
FIG. 9 is a schematic structural diagram of a pressure relief apparatus according to some further embodiments of the present application.
FIG. 10 is a schematic flow chart of a manufacturing method for a pressure relief apparatus provided by some embodiments of the present application.

In some embodiments, referring to FIG. 9, which is a schematic structural diagram of pressure relief apparatus 25 according to some other embodiments of the present application. An accommodating space is formed inside pressure relief body 251, pressure relief body 251 has a plurality of walls forming the accommodating space, the accommodating space is used for accommodating electrode assembly 22, and a pressure relief portion 2511 is formed on one wall of the plurality of walls.

One wall of the plurality of walls being provided with pressure relief portion 2511 may be that a part of one wall is pressure relief portion 2511, or the entire wall is pressure relief portion 2511. First surface 2511*a* of pressure relief portion 2511 may be an outer surface of the wall or an inner surface of the wall. The outer surface of the wall is a surface of the wall away from electrode assembly 22, and the inner surface of a surface of the wall facing electrode assembly 22.

Pressure relief body 251 may have various shapes, such as a rectangular parallelepiped and a cylinder.

In the present embodiment, a plurality of walls of pressure relief body 251 jointly form an accommodating cavity used for accommodating electrode assembly 22, and pressure relief portion 2511 is formed in one of the plurality of walls, so that pressure relief apparatus 25 has both the accommodating function for accommodating electrode assembly 22 and the pressure relief function.

In some embodiments, still referring to FIG. 9, the plurality of walls of pressure relief body 251 include peripheral wall 2512 and bottom wall 2513, peripheral wall 2512 is arranged around an edge of bottom wall 2513, and peripheral wall 2512 and bottom wall 2513 jointly jointly form the accommodating space. Pressure relief portion 2511 is formed on bottom wall 2513.

Peripheral wall 2512 is arranged around the edge bottom wall 2513, so that pressure relief body 251 forms an opening at an end opposite to bottom wall 2513, and end cap 23 is used for covering the opening.

In the embodiment where pressure relief body 251 is a cylinder, pressure relief body 251 may have two walls, one of the walls is bottom wall 2513 and the other wall is peripheral wall 2512. As shown in FIG. 9, in the embodiment where pressure relief body 251 is a rectangular parallelepiped, pressure relief body 251 may have five walls, that is, one bottom wall 2513 and four side walls, and the four side walls are connected end to end to form peripheral wall 2512.

In some embodiments, peripheral wall 2512 and bottom wall 2513 are of an integrally molded structure.

Peripheral wall 2512 and bottom wall 2513 are of an integrally molded structure, that is to say, peripheral wall 2512 and bottom wall 2513 are formed into one piece.

In the present embodiment, bottom wall 2513 is provided with pressure relief portion 2511, and peripheral wall 2512 and bottom wall 2513 are of an integrally molded structure, so that peripheral wall 2512 and bottom wall 2513 with a pressure relief function have good firmness. Such integrated design simplifies the forming process and reduces production costs.

In some embodiments, first surface 2511*a* is the outer surface of bottom wall 2513, that is, the plurality of score grooves 252 on pressure relief portion 2511 are arranged sequentially from the outer surface of bottom wall 2513 to the inner surface of bottom wall 2513, which is convenient to process score grooves 252 on pressure relief body 251.

In the second aspect, battery cell 20 is provided in an embodiment of the present application, and includes pressure relief apparatus 25 according to any one of the above embodiments.

In a third aspect, battery 100 includes box body 10 and battery cells 20 according to any one of the above embodiments, and case 10 is configured to accommodate battery cell 20.

In a fourth aspect, an electrical device includes battery 100 according to any one of the above embodiments.

The electrical device may be any of the above device using battery 100.

Referring to FIG. 4 and FIG. 5, case 21 is further provided in an embodiment of the present application. Case 21 includes a plurality of walls, and the plurality of walls jointly jointly form an accommodating space for accommodating electrode assembly 22, at least one wall is provided with a plurality of score grooves 252, and the wall has first surface 2511*a* and second surface 2511*b* opposite to each other in a thickness direction thereof. The plurality of score grooves 252 are sequentially arranged on the wall in a direction from first surface 2511*a* to second surface 2511*b*. In two adjacent score grooves 252 in the thickness direction of the wall, a maximum width of score groove 252 away from first surface 2511*a* is smaller than a minimum width of score groove 252 close to first surface 2511*a*. Case 21 of this structure integrates the pressure relief function and the accommodating function, and adopts multi-level score groove 252 structure, which can reduce the forming force received by case 21 when each level of score groove 252 is formed, thereby reducing the risk of generating cracks on case 21, and improving the long-term reliability of pressure relief apparatus 25.

A manufacture method for pressure relief apparatus 25 is provided in an embodiment of the present application. Referring to FIG. 10, which is a flow chart of the manufacture method for pressure relief apparatus 25 provided by some embodiments of the present application. The method includes the following steps:

S100: Providing pressure relief body 251, pressure relief body 251 including pressure relief portion 2511, and pressure relief portion 2511 having first surface 2511*a* and second surface 2511*b* opposite to each other in a thickness direction thereof; and

S200: Sequentially processing a plurality of score grooves 252 on pressure relief portion 2511 in a direction from first surface 2511*a* to second surface 2511*b*, wherein in two adjacent score grooves 252 in the thickness direction, a maximum width of score groove 252 away from first surface 2511*a* is less than a minimum width of score groove 252 close to first surface 2511*a*.

In some embodiments, sequentially processing a plurality of score grooves 252 on pressure relief portion 2511 in a direction from first surface 2511*a* to second surface 2511*b* includes: sequentially punching a plurality of score grooves 252 on pressure relief portion 2511 in the direction from first surface 2511*a* to second surface 2511*b*.

A plurality of score grooves 252 are sequentially formed on pressure relief portion 2511 in the direction from first surface 2511*a* to second surface 2511*b* by punching. The forming process is simple, which can reduce the punching force received by pressure relief portion 2511 during punching of each level of score groove 252, and reducing the risk of generating cracks in pressure relief portion 2511.

It should be noted that, for the relevant structure of pressure relief apparatus 25 manufactured by the manufacturing method according to the above embodiments, reference can be made to pressure relief apparatus 25 according to the foregoing embodiments, which will not be repeated here.

Figure 11:
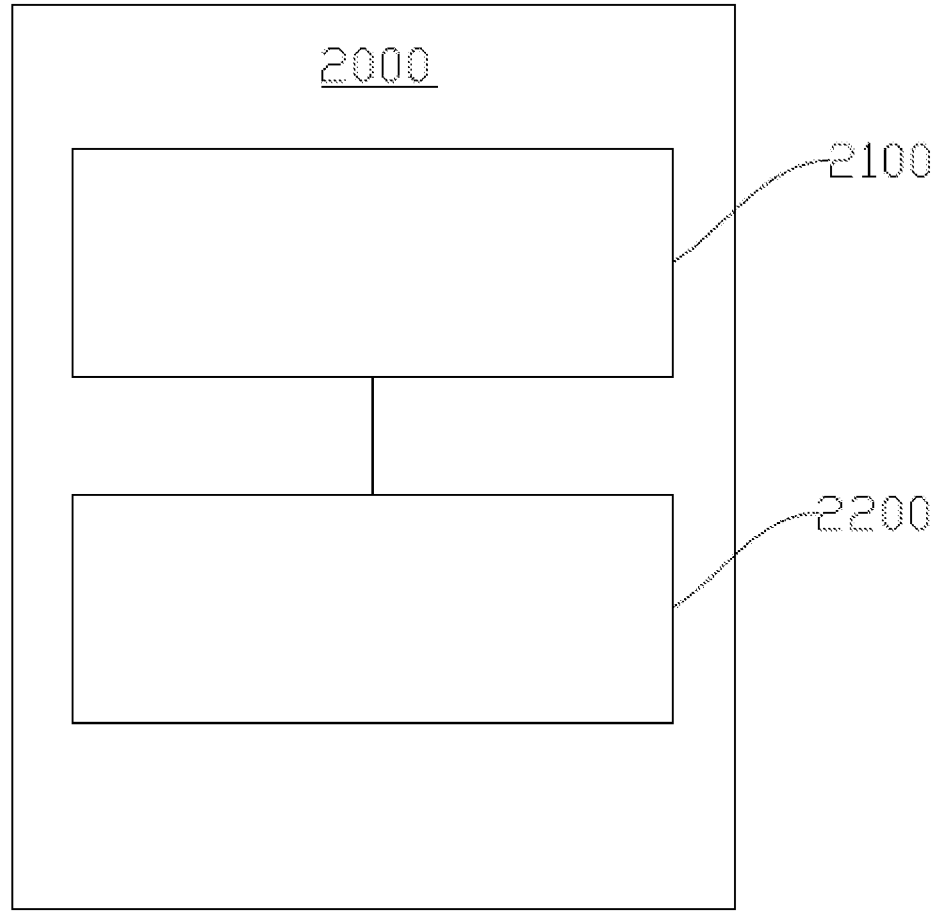
FIG. 11 is a schematic block diagram of a manufacturing device for a pressure relief apparatus provided by some embodiments of the present application.

In addition, manufacturing device 2000 for pressure relief apparatus 25 is provided in an embodiment of the present application. Referring to FIG. 11, which is a schematic block diagram of manufacturing device 2000 for pressure relief apparatus 25 provided by some embodiments of the present application. Manufacturing device 2000 includes first providing apparatus 2100 and processing apparatus 2200. First providing apparatus 2100 is configured to provide pressure relief body 251, pressure relief body 251 including pressure relief portion 2511, and pressure relief portion 2511 having first surface 2511*a* and second surface 2511*b* opposite to each other in a thickness direction thereof. Processing apparatus 2200 is configured to sequentially process a plurality of score grooves 252 on pressure relief portion 2511 in a direction from first surface 2511*a* to second surface 2511*b*. In two adjacent score grooves 252 in the thickness direction, a maximum width of score groove 252 far away from first surface 2511*a* is less than a minimum width of score groove 252 close to the first surface 2511*a*.

It should be noted that, for the relevant structure of pressure relief apparatus 25 manufactured by manufacturing device 2000 according to the above embodiment, reference can be made to pressure relief apparatus 25 according to the foregoing embodiments, which will not be repeated here.

It should be noted that in case of no conflicts, the embodiments in the present application and the features in the embodiments can be combined with each other.

The above embodiments are only used for illustrating the technical solution of the present application, and are not intended to limit the present application. For those skilled in the art, the present application may have various modifications and changes. Any modifications, equivalent replacements, improvements, and the like made within the spirit and principle of the present application shall be included within the protection scope of the present application.

What is claimed is:

1. A pressure relief apparatus, comprising:

a pressure relief body, comprising a pressure relief portion, the pressure relief portion having a first surface and a second surface opposite to each other in a thickness direction of the pressure relief portion; and a plurality of score grooves sequentially arranged at the pressure relief portion in a direction from the first surface to the second surface;

wherein:

in two adjacent score grooves of the plurality of score grooves in the thickness direction, a maximum width of one of the two adjacent score grooves that is farther away from the first surface is less than a minimum width of another one of the two adjacent score grooves that is closer to the first surface;

the plurality of score grooves comprise a first score groove, a second score groove, and a third score groove, the first score groove and the second score groove extend in a same direction, the first score groove is arranged on a bottom surface of the second score groove, the third score groove is arranged on the first surface, and the second score groove is arranged on a bottom surface of the third score groove;

the second score groove comprises a first groove section, a second groove section, and a third groove section, the first groove section and the second groove section are arranged at an interval, and both the first groove section and the second groove section intersect with the third groove section;

the pressure relief portion comprises an opening region jointly formed by the first groove section, the second groove section, and the third groove section; and the second surface is provided with a notch groove located in the opening region, the notch groove is spaced apart from the third groove section in an extension direction of the first groove section, the extension direction of the first groove section is perpendicular to the third groove section, and a distance between the notch groove and the third groove section along a direction parallel to the extension direction of the first groove section is less than a distance between the end of the first groove section and the third groove section along the extension direction of the first groove section.

2. The pressure relief apparatus according to claim 1, wherein:

the opening region is configured to open with the first groove section, the second groove section, and the third groove section as boundaries.

3. The pressure relief apparatus according to claim 1, wherein the second score groove further comprises a fourth groove section, in an extension direction of the third groove section, the fourth groove section is located between the first groove section and the second groove section, and the fourth groove section intersects with the third groove section.

4. The pressure relief apparatus according to claim 3, wherein in the extension direction of the third groove section, a distance from an intersection between the fourth groove section and the third groove section to the first groove section is equal to a distance from the intersection between the fourth groove section and the third groove section to the second groove section.

5. The pressure relief apparatus according to claim 1, wherein the opening region is one of two opening regions jointly formed by the first groove section, the second groove section, and the third groove section, and the two opening regions are located on two sides of the third groove section, respectively.

6. The pressure relief apparatus according to claim 1, wherein a distance H0 between the first surface and the second surface and a distance H1 from a bottom surface of one of the plurality of score grooves that is closest to the second surface among the plurality of score grooves to the second surface satisfy $H1/H0<0.2$.

7. The pressure relief apparatus according to claim 1, wherein:

a distance from a bottom surface of a first score groove of the plurality of score grooves that is closest to the second surface among the plurality of score grooves to the second surface is smaller than 0.5 mm;

a depth of a second score groove of the plurality of score grooves that is arranged on the first surface is smaller than 1 mm; or a depth of a third score groove of the plurality of score grooves that is between the first score grooves and the second score groove is smaller than 1.5 mm.

8. The pressure relief apparatus according to claim 1, wherein an accommodating space is formed inside the pressure relief body, the pressure relief body has a plurality of walls forming the accommodating space, the accommodating space is configured to accommodate an electrode assembly, and one of the plurality of walls is provided with the pressure relief portion.

9. The pressure relief apparatus according to claim 8, wherein the plurality of walls comprise a peripheral wall and a bottom wall, the peripheral wall is arranged around an edge of the bottom wall, the peripheral wall and the bottom wall together jointly form the accommodating space, and the bottom wall is provided with the pressure relief portion.

10. The pressure relief apparatus according to claim 9, wherein the peripheral wall and the bottom wall are of an integrally molded structure.

11. The pressure relief apparatus according to claim 9, wherein the first surface is an outer surface of the bottom wall.

12. A battery cell, comprising:

a pressure relief apparatus comprising:

a pressure relief body, comprising a pressure relief portion, the pressure relief portion having a first surface and a second surface opposite to each other in a thickness direction of the pressure relief portion; and a plurality of score grooves sequentially arranged at the pressure relief portion in a direction from the first surface to the second surface;

wherein:

in two adjacent score grooves of the plurality of score grooves in the thickness direction, a maximum width of one of the two adjacent score grooves that is farther away from the first surface is less than a minimum width of another one of the two adjacent score grooves that is closer to the first surface;

the plurality of score grooves comprise a first score groove, a second score groove, and a third score groove, the first score groove and the second score groove extend in a same direction, the first score groove is arranged on a bottom surface of the second score groove, the third score groove is arranged on the first surface, and the second score groove is arranged on a bottom surface of the third score groove;

the second score groove comprises a first groove section, a second groove section, and a third groove section, the first groove section and the second groove section are arranged at an interval, and both the first groove section and the second groove section intersect with the third groove section;

the pressure relief portion comprises an opening region jointly formed by the first groove section, the second groove section, and the third groove section; and the second surface is provided with a notch groove located in the opening region, the notch groove is spaced apart from the third groove section in an extension direction of the first groove section, the extension direction of the first groove section is perpendicular to the third groove section, and a distance between the notch groove and the third groove section along a direction parallel to the extension direction of the first groove section is less than a distance between the end of the first groove section and the third groove section along the extension direction of the first groove section.

13. A battery, comprising:

the battery cell according to claim 12; and a box body configured to accommodate the battery cell.

14. An electrical device, comprising the battery according to claim 13.

15. A manufacturing method for a pressure relief apparatus, the method comprising:

providing a pressure relief body, the pressure relief body comprising a pressure relief portion, the pressure relief portion having a first surface and a second surface opposite to each other in a thickness direction of the pressure relief portion; and sequentially processing a plurality of score grooves on the pressure relief portion in a direction from the first surface to the second surface;

wherein:

in two adjacent score grooves in the thickness direction, a maximum width of one of the two adjacent score grooves that is farther away from the first surface is less than a minimum width of another one of the two adjacent score grooves that is closer to the first surface;

the plurality of score grooves comprise a first score groove, a second score groove, and a third score groove, the first score groove and the second score groove extend in a same direction, the first score groove is arranged on a bottom surface of the second score groove, the third score groove is arranged on the first surface, and the second score groove is arranged on a bottom surface of the third score groove;

the second score groove comprises a first groove section, a second groove section, and a third groove section, the first groove section and the second groove section are arranged at an interval, and both the first groove section and the second groove section intersect with the third groove section;

the pressure relief portion comprises an opening region jointly formed by the first groove section, the second groove section, and the third groove section; and the second surface is provided with a notch groove located in the opening region, the notch groove is spaced apart from the third groove section in an extension direction of the first groove section, the extension direction of the first groove section is perpendicular to the third groove section, and a distance between the notch groove and the third groove section along a direction parallel to the extension direction of the first groove section is less than a distance between the end of the first groove section and the third groove section along the extension direction of the first groove section.

16. The manufacturing method according to claim 15, wherein sequentially processing the plurality of score grooves on the pressure relief portion in the direction from the first surface to the second surface comprises:

sequentially punching the plurality of score grooves on the pressure relief portion in the direction from the first surface to the second surface.

17. The pressure relief apparatus according to claim 1, wherein the second score groove further comprises a fourth groove section, in an extension direction of the third groove section, the fourth groove section is located between the first groove section and the second groove section, the fourth groove section intersects with the third groove section, and the fourth groove section is parallel to the first groove section and the second groove section, and perpendicular to the third groove section.

18. The pressure relief apparatus according to claim 1, wherein a depth of first groove section is equal to a depth of second groove section, and is less than a depth of third groove section.

* * * * *